United States Patent
Nibe

(10) Patent No.: US 8,442,444 B2
(45) Date of Patent: May 14, 2013

(54) METHOD OF TRANSMIT POWER CONTROL AND DEVICE THEREOF

(75) Inventor: Keiji Nibe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 224 days.

(21) Appl. No.: 12/784,161

(22) Filed: May 20, 2010

(65) Prior Publication Data

US 2010/0227563 A1 Sep. 9, 2010

Related U.S. Application Data

(63) Continuation of application No. PCT/JP2007/075174, filed on Dec. 27, 2007.

(51) Int. Cl.
*H04W 52/00* (2009.01)
*H04B 15/00* (2006.01)

(52) U.S. Cl.
USPC ............................. 455/65; 455/63.1; 455/522

(58) Field of Classification Search .................... 455/65, 455/63.1
See application file for complete search history.

(56) References Cited

U.S. PATENT DOCUMENTS

| | | | |
|---|---|---|---|
| 6,347,231 B1* | 2/2002 | Miya | 455/522 |
| 7,027,500 B1* | 4/2006 | Casas et al. | 375/232 |
| 7,363,010 B2* | 4/2008 | Oh et al. | 455/67.11 |
| 2002/0094836 A1* | 7/2002 | Nakamura et al. | 455/522 |
| 2003/0043775 A1* | 3/2003 | Kikuchi | 370/342 |
| 2003/0174686 A1* | 9/2003 | Willenegger et al. | 370/342 |
| 2004/0038699 A1* | 2/2004 | Toono | 455/522 |
| 2004/0143428 A1* | 7/2004 | Rappaport et al. | 703/22 |
| 2006/0003789 A1* | 1/2006 | Murata et al. | 455/522 |
| 2006/0058055 A1* | 3/2006 | Shintani | 455/522 |
| 2006/0171342 A1 | 8/2006 | Dateki | |
| 2006/0183431 A1* | 8/2006 | Chang et al. | 455/69 |
| 2006/0234749 A1* | 10/2006 | Morrison et al. | 455/522 |
| 2007/0173280 A1* | 7/2007 | Nakayauchi et al. | 455/522 |
| 2007/0242955 A1* | 10/2007 | Kavehrad | 398/130 |
| 2008/0025264 A1* | 1/2008 | Willenegger et al. | 370/333 |

(Continued)

FOREIGN PATENT DOCUMENTS

| | | |
|---|---|---|
| EP | 1215926 A1 | 6/2002 |
| JP | 2004040187 | 2/2004 |

(Continued)

OTHER PUBLICATIONS

International Preliminary Report on Patentability and Written Opinion of the International Searching Authority issued in PCT/JP2007/075174 dated Jul. 29, 2010.

(Continued)

*Primary Examiner* — Nay A Maung
*Assistant Examiner* — Erica Fleming-Hall
(74) *Attorney, Agent, or Firm* — Smith, Gambrell & Russell, LLP

(57) ABSTRACT

A method of transmit power control to allow a transmission side to execute transmit power control so that a signal to interference ratio (SIR) measured at a reception side is matched with a target SIR, the method includes digitizing a reception environment at the reception side, and setting the target SIR corresponding to an error rate of reception data for each of the reception environments; and changing the target SIR in accordance with the reception environment measured at the reception side or the reception environment selected at the reception side.

15 Claims, 18 Drawing Sheets

U.S. PATENT DOCUMENTS

| | | | |
|---|---|---|---|
| 2008/0051123 A1* | 2/2008 | Shinozaki | 455/517 |
| 2009/0149210 A1* | 6/2009 | Hosokawa | 455/522 |
| 2010/0222094 A1* | 9/2010 | Usuda et al. | 455/522 |

FOREIGN PATENT DOCUMENTS

| | | |
|---|---|---|
| JP | 2004088635 | 3/2004 |
| JP | 2004112624 | 4/2004 |
| JP | 2005303836 | 10/2005 |
| JP | 2006197318 | 7/2006 |
| JP | 2007208525 | 8/2007 |
| WO | 0122756 A1 | 3/2001 |
| WO | 2004114551 A1 | 12/2004 |

OTHER PUBLICATIONS

International Search Report dated May 1, 2008 in corresponding International application No. PCT/JP2007/075174.

Japanese Office Action dated Apr. 24, 2012 issued in corresponding JP Patent Application No. 2009-547835.

\* cited by examiner

| Target TPC Command Error Rate | 1path | | | | |
|---|---|---|---|---|---|
| | 0km/h | 30km/h | 60km/h | 90km/h | 120km/h |
| 0.1 | -3.3 | -2.6 | -2.5 | -2.5 | -2.5 |
| 0.09 | -3.0 | -2.3 | -2.2 | -2.2 | -2.2 |
| 0.08 | -2.8 | -2.0 | -1.7 | -1.7 | -1.7 |
| 0.07 | -2.5 | -1.6 | -1.3 | -1.3 | -1.3 |
| 0.06 | -2.3 | -1.3 | -0.7 | -0.7 | -0.7 |
| 0.05 | -2.0 | -1.0 | 0.0 | 0.0 | 0.0 |
| 0.04 | -1.5 | -0.5 | 0.6 | 0.6 | 0.6 |
| 0.03 | -1.0 | 0.0 | 1.5 | 1.5 | 1.5 |
| 0.02 | -0.4 | 1.0 | 2.5 | 2.5 | 2.5 |
| 0.01 | 0.7 | 2.5 | 4.0 | 4.0 | 4.0 |

| Target TPC Command Error Rate | USER SETTING MODE | | |
|---|---|---|---|
| | INSIDE ROOM | EXPRESS BUS | BULLET TRAIN |
| 0.1 | -3.3 | -2.6 | -2.5 |
| 0.09 | -3.0 | -2.3 | -2.2 |
| 0.08 | -2.8 | -2.0 | -1.7 |
| 0.07 | -2.5 | -1.6 | -1.3 |
| 0.06 | -2.3 | -1.3 | -0.7 |
| 0.05 | -2.0 | -1.0 | 0.0 |
| 0.04 | -1.5 | -0.5 | 0.6 |
| 0.03 | -1.0 | 0.0 | 1.5 |
| 0.02 | -0.4 | 1.0 | 2.5 |
| 0.01 | 0.7 | 2.5 | 4.0 |

FIG.18

| Target TPC Command Error Rate | Target SIR |
|---|---|
| 0.1 | -3.3 |
| 0.09 | -3.0 |
| 0.08 | -2.8 |
| 0.07 | -2.5 |
| 0.06 | -2.3 |
| 0.05 | -2.0 |
| 0.04 | -1.5 |
| 0.03 | -1.0 |
| 0.02 | -0.4 |
| 0.01 | 0.7 |

METHOD OF TRANSMIT POWER CONTROL AND DEVICE THEREOF

CROSS-REFERENCE TO RELATED APPLICATIONS

This application is a continuation of International Application No. PCT/JP2007/075174, filed on Dec. 27, 2007, now pending, herein incorporated by reference.

FIELD

The embodiments discussed herein are related to a method of transmit power control of a wireless communication system and a device thereof, for example, to a method of transmit power control used for a wireless communication system of a W-CDMA (Wideband-Code Division Multiple Access) system, etc. and a device thereof.

BACKGROUND

A W-CDMA system is one of wireless communication interfaces provided by IMT-2000 (International Mobile Telecommunications-2000). The W-CDMA system which is the mainstream of a wireless communication system has a maximum transmission rate of 384 (kbps) to enable an access to multimedia such as a sound, a moving image and data. As a communication system based on the communication technique of this W-CDMA system, a study and development of a HSDPA (High Speed Downlink Packet Access) system are being advanced. This HSDPA system performs high speed downlink packet transmission downstream, and realizes a maximum transmission rate of 14.4 (Mbps).

Concerning power control in such a wireless communication system, Japanese Laid-open Patent Publication No. 2005-303836 discloses that an A-DPCH transmission power setting section, a target error rate setting section and an HS-SCCH transmission power setting section are provided, and the A-DPCH transmission power setting section sets transmission power to each mobile station device (MS) to which A-DPCH is assigned, the target error rate setting section individually sets, based on the environment of propagation with each MS, a target reception error rate Target-BLER of HS-SCCH when control information is transmitted to each MS, and the HS-SCCH transmission power setting section sets, based on the set transmission power and target reception error rate Target-BLER, transmission power of HS-SCCH in the case of transmitting control information transmitted to each MS.

Japanese Laid-open Patent Publication No. 2006-197318 discloses that in a mobile radio communication system and radio communication apparatuses comprising at least a movable radio communication apparatus among a plurality of radio communication apparatuses, multiplexing channels comprising at least a traffic channel for transmitting packets, a control channel for transmitting control information for packet receiving, and a channel for transmitting information comprising transmission power control information, and performing radio communication between one radio communication apparatus such as a base station and the other radio communication apparatus such as a mobile station, the transmission power control information is transmitted by the channel for transmitting the information comprising the transmission power control information in a constant period longer than the length of a packet from the one radio communication apparatus to the other radio communication apparatus, and the transmission power control information is transmitted by the control channel when the packet is transmitted by the traffic channel.

International Publication Pamphlet No. WO 2004/114551 discloses that a transmission power controlling method wherein on a reception side, an error rate of received data is compared with a target error rate to control the target desired-wave to interference-wave ratio (SIR: Signal to Interference Ratio), and on a transmission side, the transmission power is controlled such that the measured SIR becomes coincident with the foregoing target SIR, the characteristics of correspondences between error rates and SIRs are measured and stored beforehand, and then used to obtain first and second SIRs corresponding to the target and measured error rates, respectively, and the difference between the first and second SIRs is used to raise/reduce the target SIR and thereby update the target SIR.

In the conventional communication of the W-CDMA system, as depicted in FIG. 12, a mobile terminal device (UE: User Equipment) 2 performs wireless communication as moving within a service area 6 in a base station (Node-B) 4. Therefore, the mobile terminal device 2 has a transmission and reception unit 8 that processes amplification and modulation/demodulation of a wireless signal transmitted and received to/from the base station 4, and a signal processing unit 10 that executes an encoding process, a decoding process, and so on. The base station 4 has a transmission and reception unit 12 that includes an amplifier and a modulation and demodulation part of a wireless signal transmitted and received to/from the mobile terminal device 2, and an interface 18 for connecting the signal processing unit 14 executing an encoding process, a decoding process, and so on to a network 16.

In the communication of the W-CDMA system, the mobile terminal device 2 transmits transmit power control (TPC) information at regular intervals by a link from the mobile terminal device 2 in order that a signal transmitted from the base station 4 to the mobile terminal device 2 is received at the mobile terminal device 2 with sufficient power and interference to other channels due to transmission with excessive power is minimized. The base station 4 executes transmit power control that increases and reduces transmit power of the transmission and reception unit 12 according to this TPC information. TPC information is information generated according to a reception level (quality) of a data signal and so on transmitted from the base station 4, and information for giving instructions of reducing transmit power if a reception level (quality) is high, and giving instructions of increasing transmit power if a reception level (quality) is low.

As enhancement of the wireless communication system of the W-CDMA system, F-DPCH (Fractional Dedicated Physical Channel) is standardized by 3GPP Release 6 (3rd Generation Partnership Project Release 6). This transmits TPC information by a dedicated channel, that is, includes TPC bit patterns (FIGS. 13 and 14) as TPC information.

As a frame structure including TPC information, FIG. 13 depicts frame structure of F-DPCH, FIG. 14 depicts frame structure of DPCH (Dedicated Physical Channel), FIG. 15 depicts frame structure of DPDCH (Dedicated Physical Data Channel) and uplink DPCCH (Dedicated Physical Control Channel) and FIGS. 16A-D depict transmit timings of DPCCH. DPDCH is user information and DPCCH is control information.

Since a user executing data reception by a common channel (traffic channel) such as HS-PDSCH transmits traffic data by HS-PDSCH, there is often a case that data to be transmitted by a dedicated channel (for example, DPCH different from an HS channel) is almost not present. Transmit power control needs connection of a dedicated channel (DPCH) simultaneously with HS-PDSCH along with transmission of TPC bit patterns. Therefore, one code is occupied although there is no need to transmit data. This results in resource shortage since there are a plurality of the same users. Thus, this resource shortage is dissolved by F-DPCH transmitting only TPC bit patterns to a user who does not have data to be transmitted by a desiccated channel.

As described above, in the W-CDMA system, TPC information is transmitted at regular intervals by an uplink from the mobile terminal device 2 in order that a signal transmitted from the base station 4 to the mobile terminal device 2 is received at the mobile terminal device 2 with sufficient power and interference to other channels due to transmission with excessive power is minimized. The base station 4 executes transmit power control that increases and reduces transmit power of the transmission and reception unit 12 according to this TPC information. This TPC information is generated according to a reception level (quality) of a data signal and so on transmitted from the base station 4, gives instructions of reducing transmit power if a reception level (quality) is high, and gives instructions of increasing transmit power if a reception level (quality) is low.

In a dedicated channel (DPCH), two types of high speed TPC control are executed for executing high accurate TPC control that are inner loop TPC control controlling SIR, which is measured, so as to be Target SIR that is required reception quality, and outer loop TPC control executing CRC calculation of DPCH for adapting to the environment of propagation of the number of transmission paths, a moving rate, etc. to correct Target SIR so as to be required BLER (Block Error Rate).

In TPC control of F-DPCH, SIR of TPC bit patterns and reception quality of F-DPCH are correlated since a CRC signal is not added to a data format of F-DPCH. Target SIR is set so as to be required F-DPCH reception quality, and the measured SIR of TPC bit patterns is controlled so as to be Target SIR.

For such control, a calculation process of ISCP (Interference Signal Code Power) and RSCP (Received Signal Code Power) of F-DPCH (FIG. 17) is needed. ISCP is interference wave reception power and RSCP is desired wave reception power. FIG. 17 depicts an image of a timing diagram of calculation processes of ISCP, RSCP and SIR in F-DPCH by the symbol.

For F-DPCH demodulation in the mobile terminal device 2 which is a mobile device, in order to demodulate a certain slot (slot #<n>), a channel estimation filter process from a reception wave of slot #<n−1> of CPICH (Common Pilot Channel) is needed. This process is for controlling uplink transmit power in accordance with a TPC command after 1024 [chips] from reception of F-DPCH. Also, measurement of reception quality of F-DPCH is needed for mapping control of a TPC bit pattern on upstream DPCCH transmitted after 1024 [chips]. For measuring reception quality of F-DPCH of slot #<n>, the channel estimation filtering process is executed from reception data of slot #<n−1> of CPICH to calculate ISCP and RSCP.

ISCP is interference power of a reception signal. This ISCP is calculated by a calculation process of a CPICH symbol received at the same time of reception time of a TPC symbol of F-DPCH of slot #<n> and a channel estimate calculated by the channel estimation filtering process from a reception wave of slot #<n−1> of CPICH. Therefore, an ISCP value deteriorates under the environments that the central time of channel estimation filtering is past time and that a channel estimation result varies for a short time in accordance with a fading environment, a multipath environment, etc. and the past channel estimate and the current channel estimate are different. Since ISCP is a physical quantity that does not effect on the fading environment and multipath environment of a mobile device inherently, the accuracy of ISCP deteriorates under the fading environment and multipath environment. Therefore, the SIR measurement accuracy of F-DPCH deteriorates, and the accuracy of conversion to Target TPC Command Error Rate deteriorates. A power control signal is transmitted from the mobile terminal device 2 to the base station 4. Since this power control signal is transmitted from the base station 4 to the mobile terminal device 2, an error rate of reception data of the mobile terminal device 2 can be detected in the mobile terminal device 2. This error rate is Target TPC Command Error Rate.

Conventionally, a conversion table depicting Target SIR corresponding to Target TPC Command Error Rate is used as depicted in FIG. 18 for obtaining Target SIR of F-DPCH corresponding to Target TPC Command Error Rate.

In such a conversion table (FIG. 18), necessary power control may not be executed because conversion to proper Target SIR may not be formed since a situation different from a normal environment such as a fading environment is not assumed.

If power control of F-DPCH may not be normally executed in the base station 4, power beyond necessity is transmitted. Excessive power transmission bears on wireless resources to lower throughput of a system. If F-DPCH is transmitted with power below the reception capability of the mobile terminal device 2, there occurs inconvenience that transmit power control may not be normally executed at the mobile terminal device 2 side.

Concerning such problems, there is no suggestion or disclosure thereof in Japanese Laid-open Patent Publication Nos. 2005-303836 and 2006-197318 and International Publication Pamphlet No. WO 2004/114551, and no disclosure about solving means thereof is presented.

According to an aspect of the embodiments, a method of transmit power control to allow a transmission side to execute transmit power control so that a signal to interference ratio (SIR) measured at a reception side is matched with a target SIR, the method includes digitizing a reception environment at the reception side, and setting the target SIR corresponding to an error rate of reception data for each of the reception environments; and changing the target SIR in accordance with the reception environment measured at the reception side or the reception environment selected at the reception side. According to such structure, power control can be executed with high accuracy in comply with a reception environment since the target SIR set by each reception environment is changed according to the change of the reception environment. Thus, the above object can be achieved.

According to another aspect of the embodiments, a device of transmit power control to allow a transmission side to execute transmit power control so that an SIR measured at a reception side is matched with a target SIR, the device includes a storage unit to be set for each reception environment at the reception side, and to store the target SIR corresponding to an error rate of reception data; and a control unit to update the SIR to the target SIR in accordance with the reception environment measured at the reception side or the reception environment selected at the reception side. Such structure can also achieve the above object.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

Other objects, features and advantages of the embodiments of the present invention become clearer by referring to the attached drawings and each of the embodiments.

BRIEF DESCRIPTION OF DRAWINGS

FIG. 3 depicts an example of a conversion table;

FIG. 8 depicts an example of a conversion table;

FIG. 18 depicts a conversion table of Target SIR corresponding to Target TPC Command Error Rate;

DESCRIPTION OF EMBODIMENTS

The embodiments of the present invention is a method of transmit power control that allows a transmission side to execute transmit power control so that a measured value of SIR is identical to target SIR, and a device thereof. The reception environment at a reception side is digitized, and the target SIR corresponding to the error rate of reception data is changed in accordance with the reception environment measured at the reception side or a selected reception environment. Thereby, high accuracy of power control adapting to a reception environment can be achieved.

First Embodiment

Figure 1:
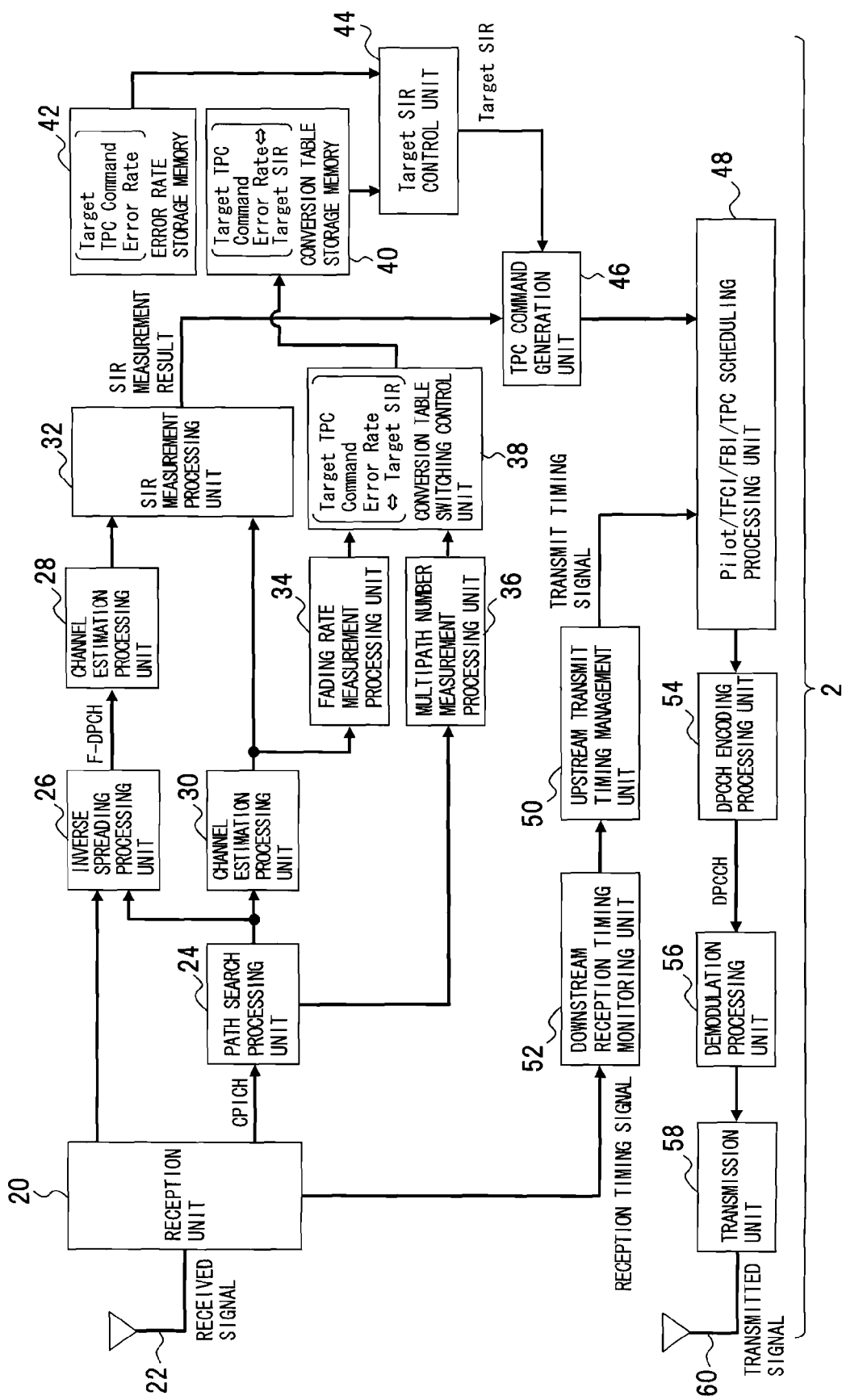
FIG. 1 depicts an example of structure of a mobile terminal device according to a first embodiment.

A first embodiment will now be described with reference to FIG. 1. FIG. 1 depicts a mobile terminal device according to the first embodiment. The structure depicted in FIG. 1 is an example, and the present invention is not limited to such structure.

In this first embodiment, a plurality of conversion tables are set for every reception environment that convert Target TPC Command Error Rate adapting to, for example, a fading rate and/or the number of multipaths as reception environment and the change thereof to Target SIR, the fading rate and/or the number of multipaths are measured, and a conversion table switches to that adapting to the measured reception environment and the change thereof. Thereby, Target SIR is obtained from the switching conversion table, and this Target SIR is compared with a measured SIR to execute power control using the Target SIR. Here, Target TPC Command Error Rate is the error rate that is detected from reception data of TPC Command that is transmitted from the mobile terminal device 2 (FIG. 12) to the base station 4 (FIG. 12), and from the base station 4 to the mobile terminal device 2. Target SIR is a signal to interference ratio which is a target value set by that error rate. In such structure, if "Target SIR" is obtained in accordance with a reception environment and the change thereof, high accuracy of TPC control can be achieved to execute proper power control of F-DPCH.

Figure 12:
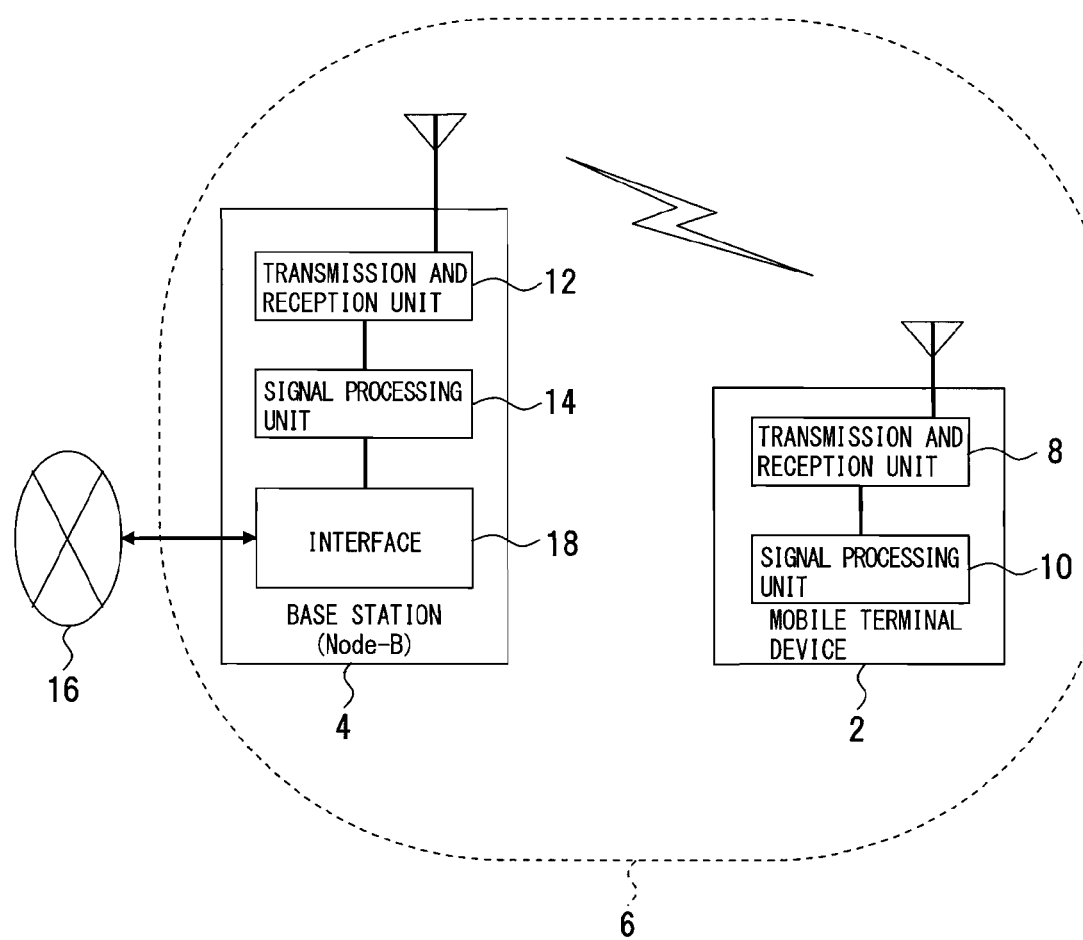
FIG. 12 depicts a wireless communication system of a mobile terminal device and a base station.
Figure 13:
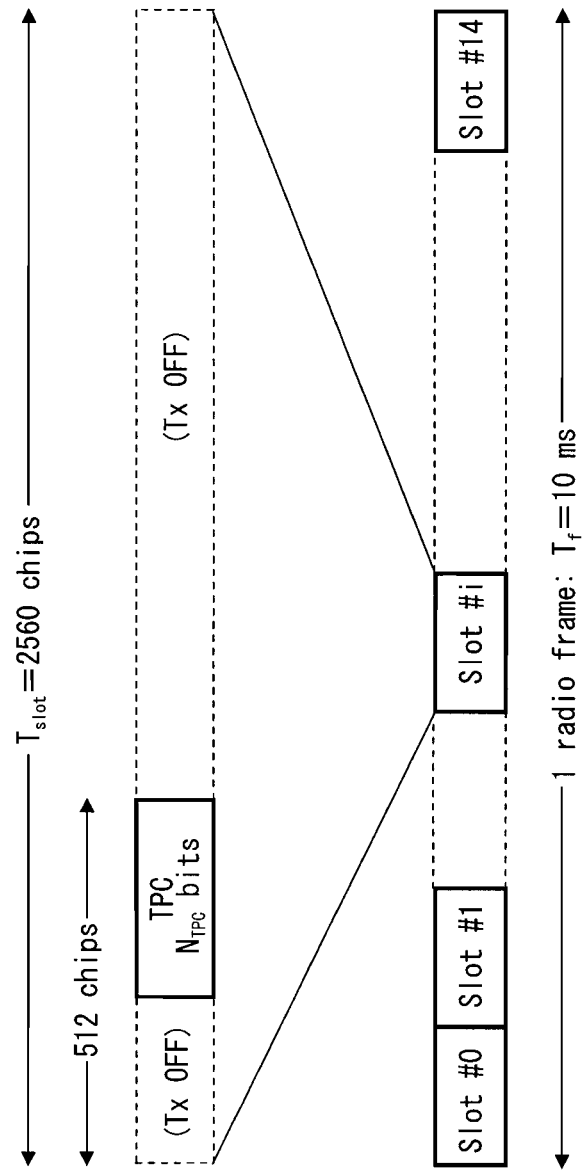
FIG. 13 depicts frame structure of F-DPCH.
Figure 14:
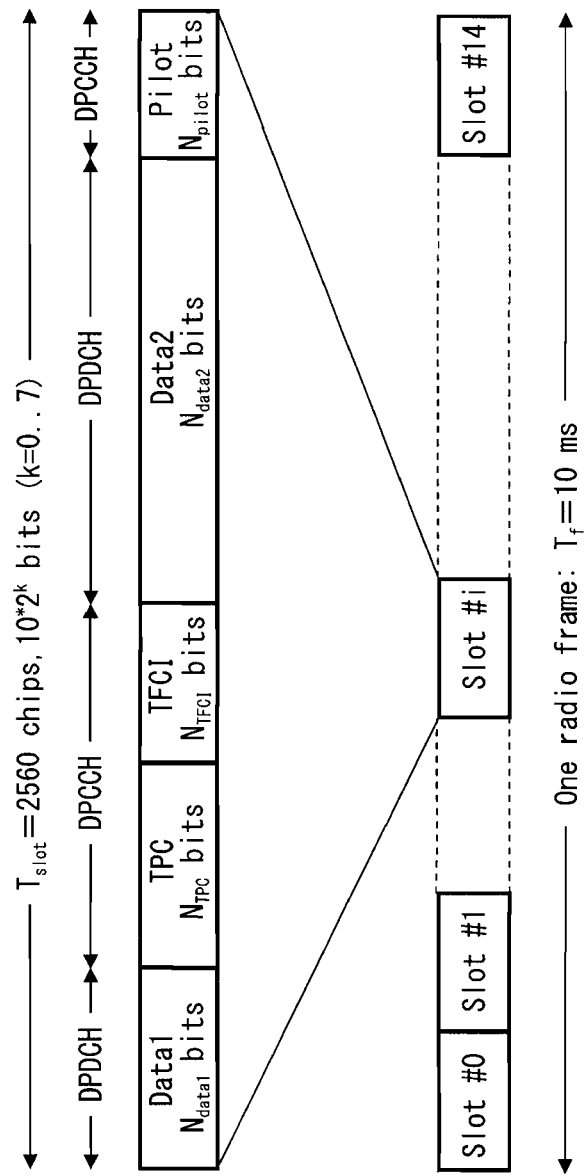
FIG. 14 depicts frame structure of DPCH.
Figure 15:
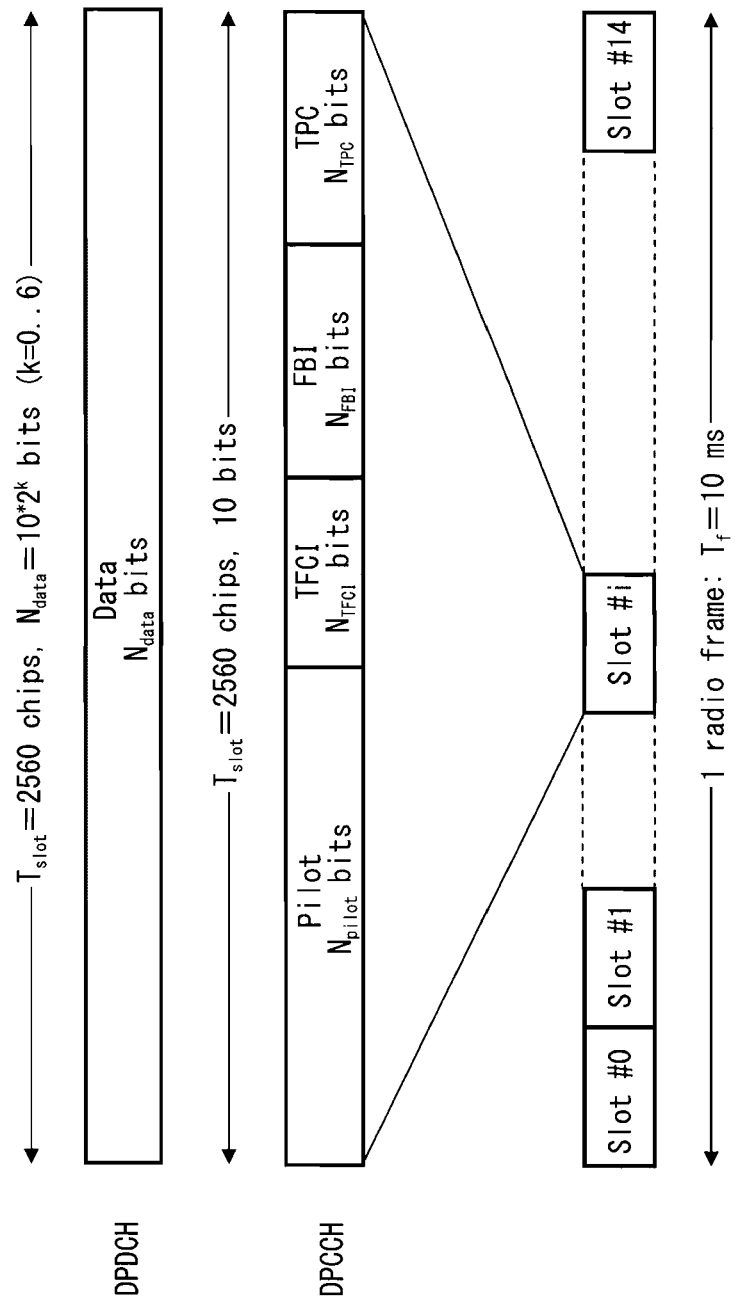
FIG. 15 depicts frame structure of DPDCH and uplink DPCCH.
Figure 16:
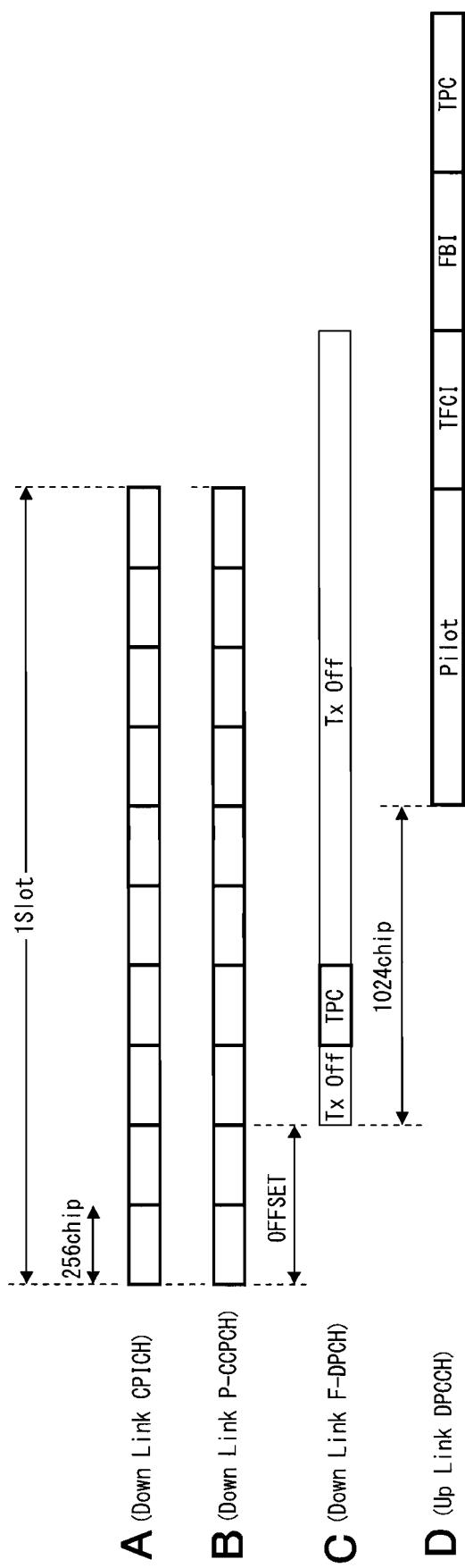
FIGS. 16A-D depict transmit timings of DPCCH.
Figure 17:
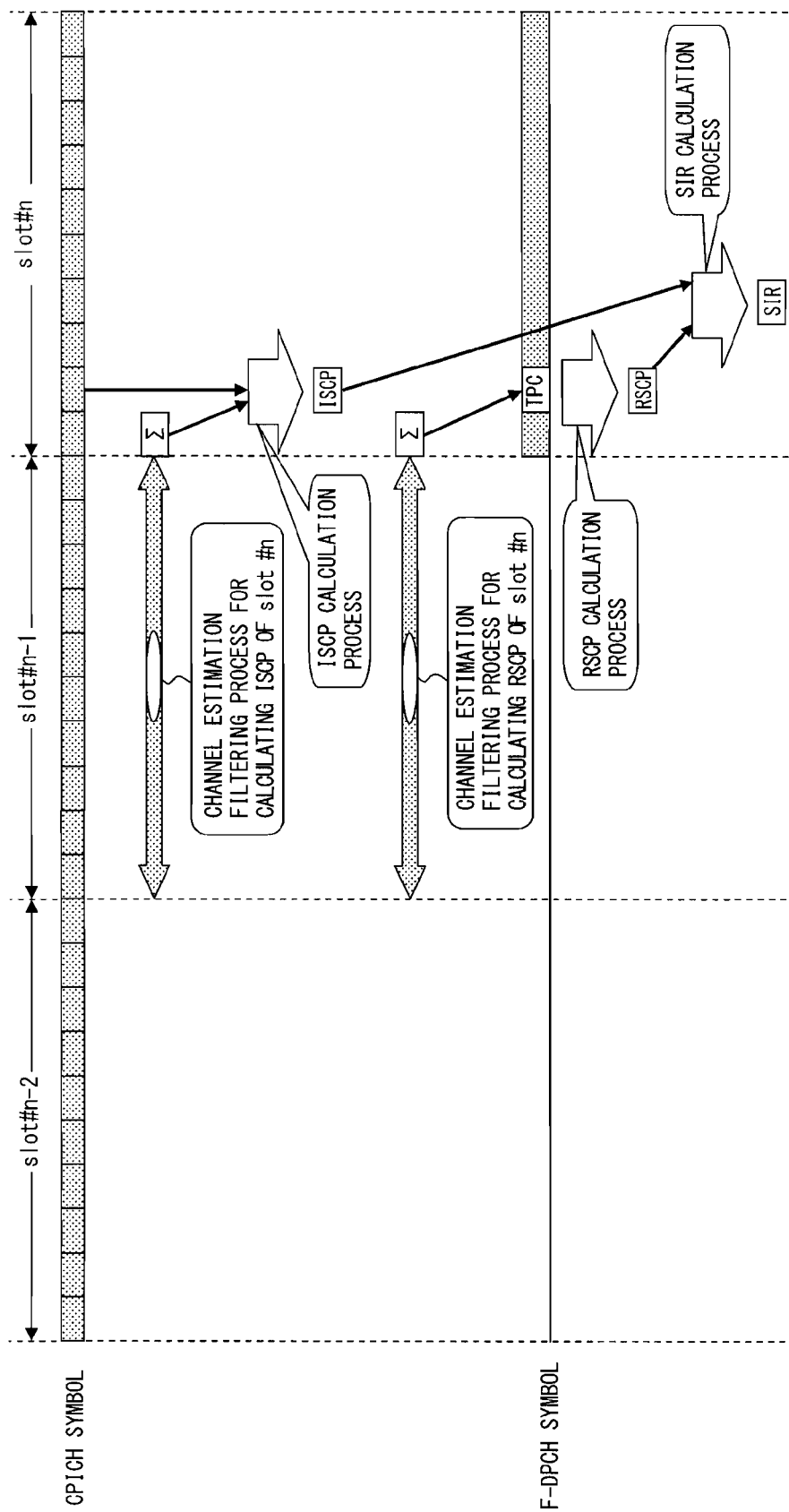
FIG. 17 depicts an image of a timing diagram of calculation processes of ISCP, RSCP and SIR in F-DPCH by the symbol.

The mobile terminal device 2 is one example of a transmit power control device, forms a mobile device corresponding to TPC control of F-DPCH, transmits a wireless signal including TPC control data to the base station 4, and receives a TPC control data wireless signal from the base station 4 (FIG. 12).

A reception unit 20 receives a signal transmitted from the base station 4 (FIG. 12) by a reception antenna 22, execute frequency conversion and quadrature detection on the received signal, and obtains a base band signal. A path search processing unit 24 is a path detection unit, and detects a path using CPICH (Common Pilot Channel) obtained in the reception unit 20. An inverse spreading processing unit 26 receives the received signal of the reception unit 20 and a path detection output from the path search processing unit 24, executes inverse spreading process, etc. to the received signal, and executes separation of each channel to obtain F-DPCH (Fractional Dedicated Physical Channel). A channel estimation processing unit 28 executes a channel estimation process and a channel compensation process of F-DPCH. A channel estimation processing unit 30 executes a channel estimation process and a channel compensation process of CPICH. An SIR measurement processing unit 32 is a measuring unit that measures SIR from reception data, and executes a measuring process of SIR using an output from each of the channel estimation processing units 28 and 30.

A fading rate measurement processing unit 34 receives the output of CPICH from the channel estimation processing unit 30, and measures a fading rate FV. This fading rate FV depicts a reception environment and the change thereof. To measure this fading rate FV is to digitize a reception environment. A multipath number measurement processing unit 36 measures the number of multipaths MP based on the path detection of the path search processing unit 24. This number of multipaths MP is the number of reception paths and depicts a reception environment and the change thereof. To measure this number of multipaths MP is to digitize a reception environment. Each output of the fading rate measurement processing unit 34 and the multipath number measurement processing unit 36 is applied to a conversion table switching control unit 38. This conversion table switching control unit 38 is switching control means of a conversion table in a conversion table storage memory 40, and switches a plurality of conversion tables, which convert Target TPC Command Error Rate to Target SIR, by the fading rate FV and/or the number of multipaths MP.

The conversion table storage memory 40 is a plurality of data tables stored in a storage unit, uses the fading rate FV and the number of multipaths MP for parameters as a reception environment, and stores Target SIR corresponding to Target TPC Command Error Rate. Target TPC Command Error Rate is data stored in an error rate storage memory 42, and is provided from UTRAN (UMTS Terrestrial Radio Access Network). A unique value may be used for Target TPC Command Error Rate. The error rate storage memory 42 is a storage unit storing the provided Target TPC Command Error Rate.

In this embodiment, switching control of a conversion table in the conversion table storage memory 40 adapting to the fading rate FV and/or the number of multipaths MP is executed by the conversion table switching control unit 38.

A Target SIR control unit 44 calculates Target SIR using the switched conversion table and Target TPC Command Error Rate in the error rate storage memory 42. This obtained Target SIR is provided to a TPC command generation unit 46.

The TPC command generation unit 46 is generation means of a power control command that is power control information for being provided to the base station 4 side, compares an SIR measurement result from the SIR measurement processing unit 32 with Target SIR from the Target SIR control unit 44, and generates a TPC command. This TPC command is instruction information instructing power increase (UP) or power reduction (DOWN) to the base station 4 side. The TPC command generation unit 46 generates control information of power increase (UP) or power reduction (DOWN) in accordance with the comparison of the SIR measurement result with Target SIR, that is, the magnitude of both of them to provide the information to a Pilot/TFCI (Transport Format Combination Indicator)/FBI (Feedback Information)/TPC scheduling processing unit 48. Pilot is a pilot bit pattern inserted for checking amplitude variation of a received signal. TFCI is information representing the number of transport channels that are superimposed on DPDCH of a reception frame and a format form of each transport channel. FBI is a control signal transmitted from the mobile terminal device 2 to the base station 4 for transmit diversity executed at a transmission side.

The scheduling processing unit 48 for Pilot/TFCI/FBI/TPC is processing means executing a scheduling process of Pilot, TFCI, FBI and TPC of an upstream DPCCH. For this scheduling process of the scheduling processing unit 48, a transmission timing signal provided from an upstream transmission timing management unit 50 is used. The upstream transmission timing management unit 50 is means generating transmission timing of an upstream signal to be transmitted from the mobile terminal device 2 to the base station 4, and generates a transmission timing signal using a reception timing signal provided from a downstream reception timing monitoring unit 52. The downstream reception timing monitoring unit 52 receives the provision of the reception timing signal from the reception unit 20, and monitors downstream reception timing using this reception timing signal.

A DPCCH encoding processing unit 54 encodes DPCCH that is control information provided from the scheduling processing unit 48. A demodulation processing unit 56 is processing means executing a demodulation process of DPCCH and each uplink channel, and transmits the demodulated signal to a transmission unit 58. The transmission unit 58 is transmission means of an uplink channel, and transmits a transmit signal demodulated by the demodulated signal of DPCCH and each uplink channel to the base station 4 by an antenna 60.

Figure 2:
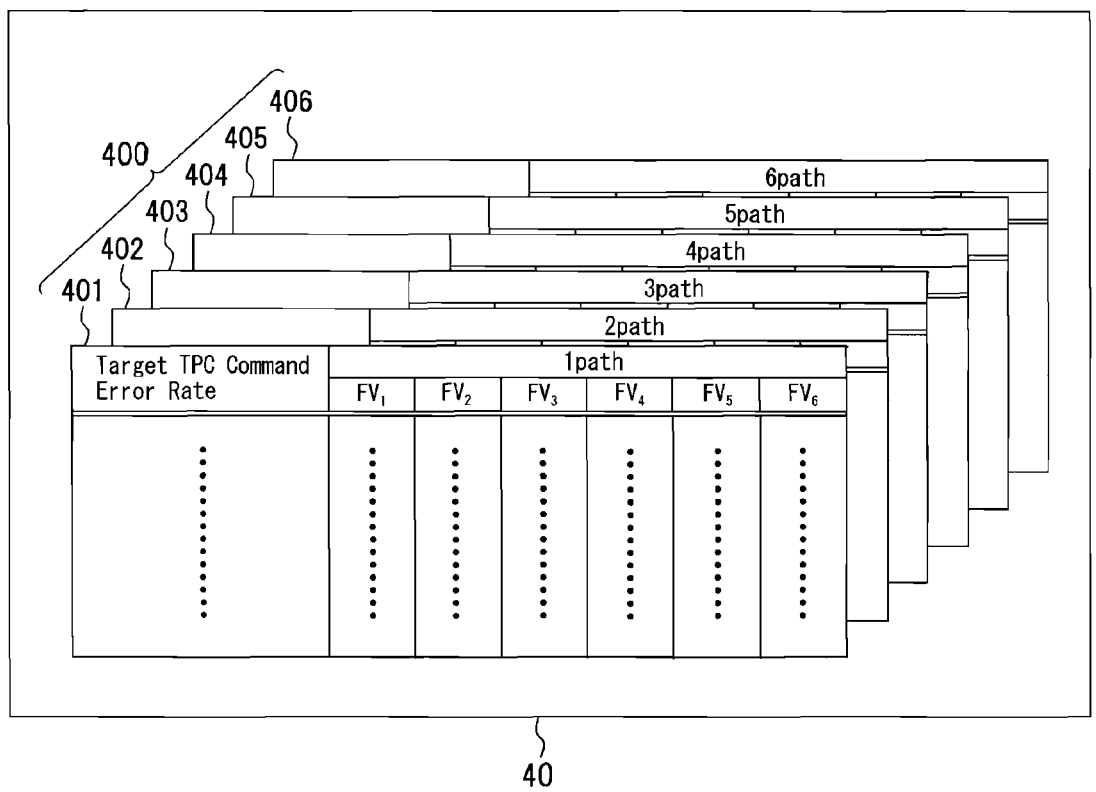
FIG. 2 depicts an example of a group of conversion tables stored in a conversion table storage memory.

The conversion table storage memory 40 will be described with reference to FIGS. 2 and 3. FIG. 2 depicts a group of conversion tables, and FIG. 3 depicts a conversion table. The conversion tables in FIGS. 2 and 3 are an example, and the present invention is not limited to such conversion tables.

A group of conversion tables 400 made up of a plurality of conversion tables are stored in the conversion table storage memory 40. In the group of conversion tables 400, as depicted in FIG. 2, six sets of conversion tables 401, 402, 403, 404, 405 and 406, which are formed by Target SIR corresponding to Target TPC Command Error Rate, are set using the fading rate FV and the number of multipaths MP as parameters. The conversion table 401 corresponds to MP=1, the conversion table 402 corresponds to MP=2, the conversion table 403 corresponds to MP=3, . . . and the conversion table 406 corresponds to MP=6.

As an example, in the conversion table 401 (MP=1), as depicted in FIG. 3, Target SIR corresponding to Target TPC Command Error Rate is set using $FV_1=0$ [km/h], $FV_2=30$ [km/h], $FV_3=60$ [km/h], $FV_4=90$ [km/h] and $FV_5=120$ [km/h] for the fading rate FV as parameters.

Therefore, according to the group of conversion tables 400, if the fading rate FV and the number of multipaths MP are calculated, Target TPC Command Error Rate corresponding to the fading rate FV and the number of multipaths MP can be converted to Target SIR to be taken out by any of the conversion table 401, 402, 403, 404, 405 or 406 selected by a switching process of a conversion table in accordance with the fading rate FV and the number of multipaths MP.

Figure 4:
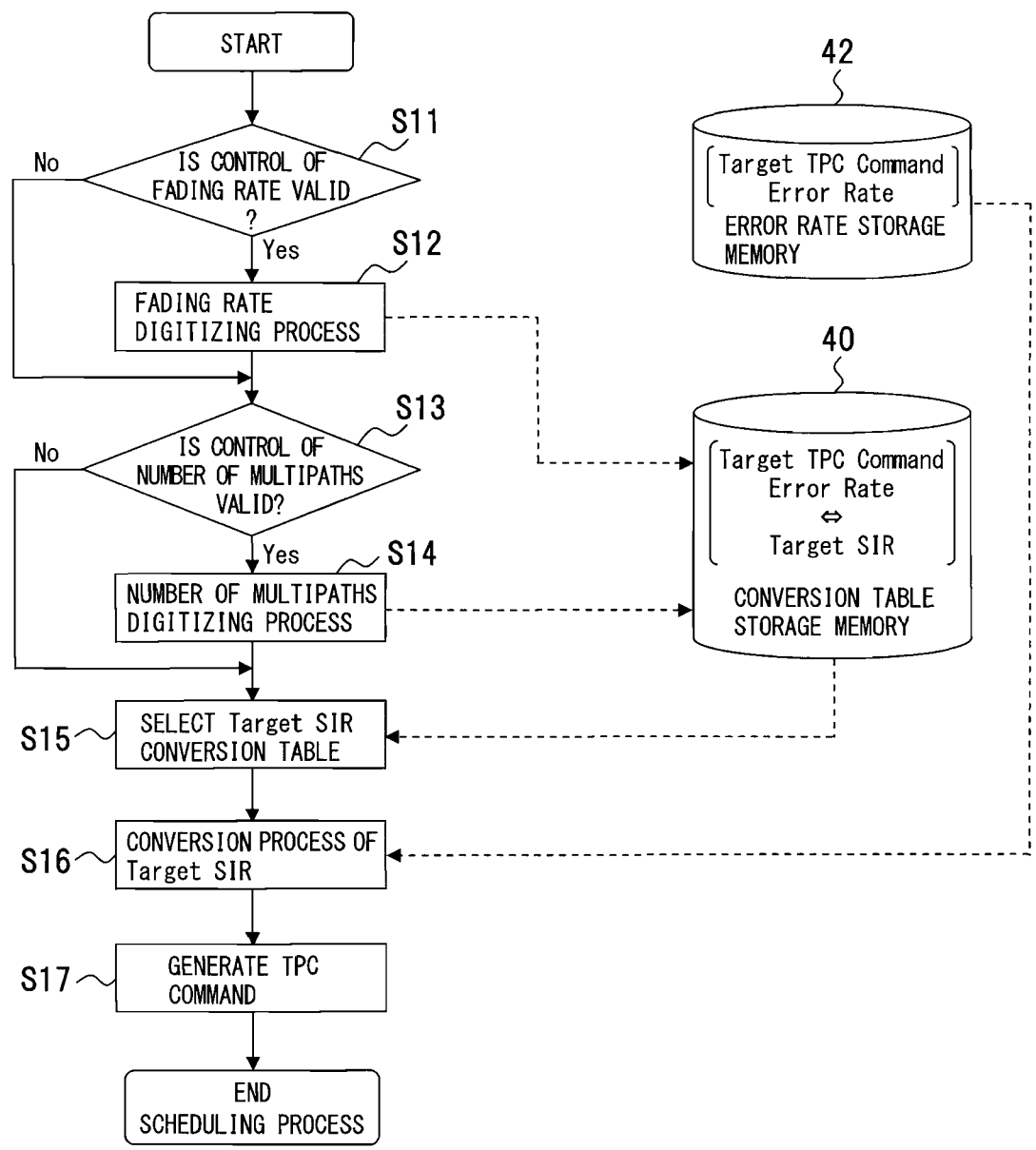
FIG. 4 depicts an example of processing procedure of a generation process of a TPC command.

Processing procedure for power control will be described with reference to FIG. 4. FIG. 4 is a flowchart depicting processing procedure of a generation process of a TPC command. This processing procedure is an example, and the present invention is not limited to this processing procedure.

By start of power control, it is determined whether control of a fading rate is valid or not as a reception environment (step S11). If the control of a fading rate is valid (YES of step S11), a digitizing process of a fading rate is executed (step S12), and the fading rate is used for a selection process of the conversion tables 401, 402 . . . 406 in the conversion table storage memory 40.

If the control of a fading rate is not valid (NO of step S11), it is determined whether control of the number of multipaths is valid or not as a reception environment without executing the digitizing process of a fading rate (step S13). If the control of the number of multipaths is valid (YES of step S13), a digitizing process of the number of multipaths is executed (step S14), and the number of multipaths is used for the selection process of the conversion tables 401, 402 . . . 406 in the conversion table storage memory 40.

If the control of the number of multipaths is not valid (NO of step S13), selection of a conversion table of Target SIR is executed without executing the digitizing process of the number of multipaths (step S15), a conversion process of Target SIR is executed using a selected conversion table and an error rate in the error rate storage memory 42 (step S16), and TPC command is generated from Target SIR that is obtained from this conversion process (step S17). After this generation of a TPC command, the above described scheduling process is executed.

Therefore, in the TPC control of F-DPCH, as a conversion table that converts Target TPC Command Error Rate to Target SIR if a plurality of conversion tables 401 to 406 that convert Target TPC Command Error Rate adapting to a fading rate and the number of multipaths, which are a reception environment and the change thereof, to Target SIR are set for each different fading rate and every number of multipaths, a conversion table is switched to one of the conversion tables 401 to 406 that stores data proper to the reception environment by using a measured fading rate and number of multipaths. Target SIR and measured SIR are compared by using anyone of the conversion tables 401 to 406, optimum Target SIR corresponding to the reception environment and the change thereof is obtained, and TPC control can be executed. Thus, the power control of F-DPCH can be properly executed.

Since Target SIR corresponding to TPC Command Error Rate of F-DPCH can be measured with high accuracy adapting to the fading environment and the multipath environment in receiving F-DPCH, the power control of F-DPCH at the base station 4 can be improved to achieve high accuracy.

Thus, the problem that the base station 4 transmits power beyond necessity to bear on wireless resources, and throughput of a system is lowered can be dissolved. It can be also prevented that the base station 4 transmits F-DPCH with power below the reception capability of the mobile terminal device 2. Thus, the inconvenience that transmit power control at the mobile terminal device 2 may not be normally executed can be improved. As a result, transmit and receive throughput of the mobile terminal device 2 and throughput of a system can be improved.

Figure 5:
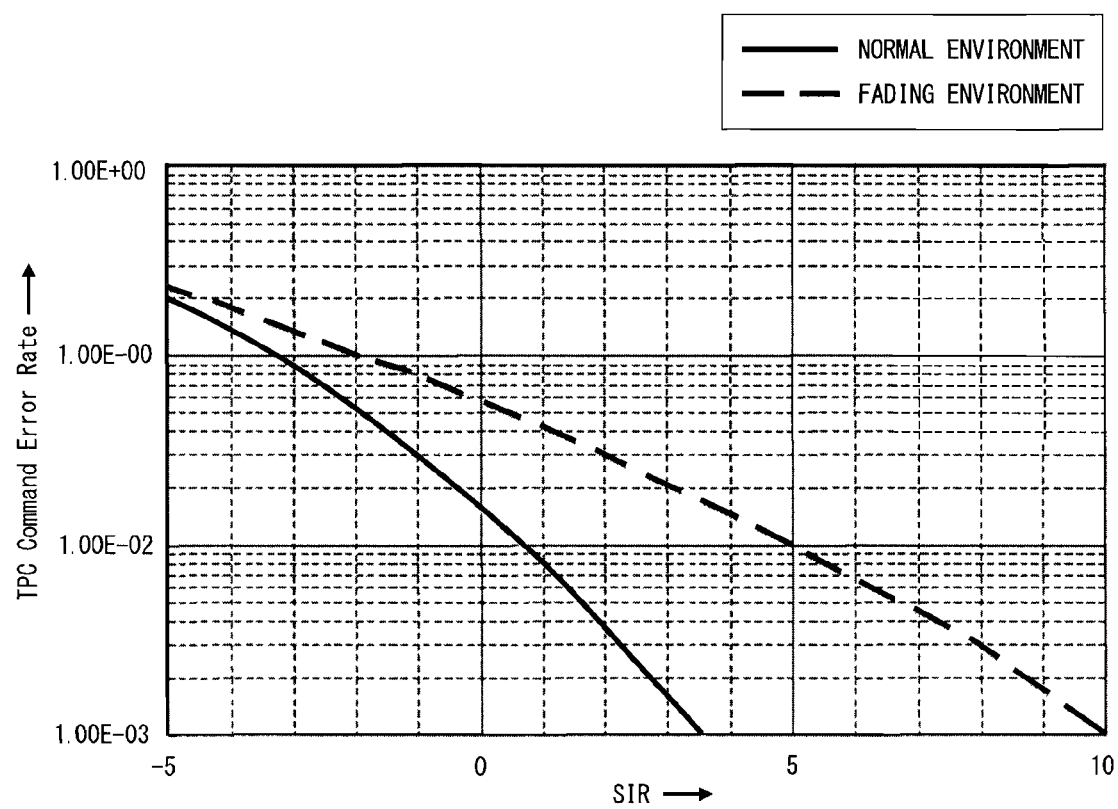
FIG. 5 depicts SIR characteristics and TPC Command Error Rates in receiving F-DPCH under a normal environment and under a fading environment.

SIR characteristics and TPC Command Error Rate will be described with reference to FIG. 5. FIG. 5 is a graph depicting SIR characteristics and TPC Command Error Rate in receiving F-DPCH under a normal environment and a fading environment quantitatively. As apparent from this graph, SIR characteristics and TPC Command Error Rate under a normal environment are enormously different from those under a fading environment. If the above described fading rate is measured, and Target SIR corresponding to the measured rate is used, high accuracy of the power control of F-DPCH can be achieved under the fading environment as well as under the normal environment.

Second Embodiment

Figure 6:
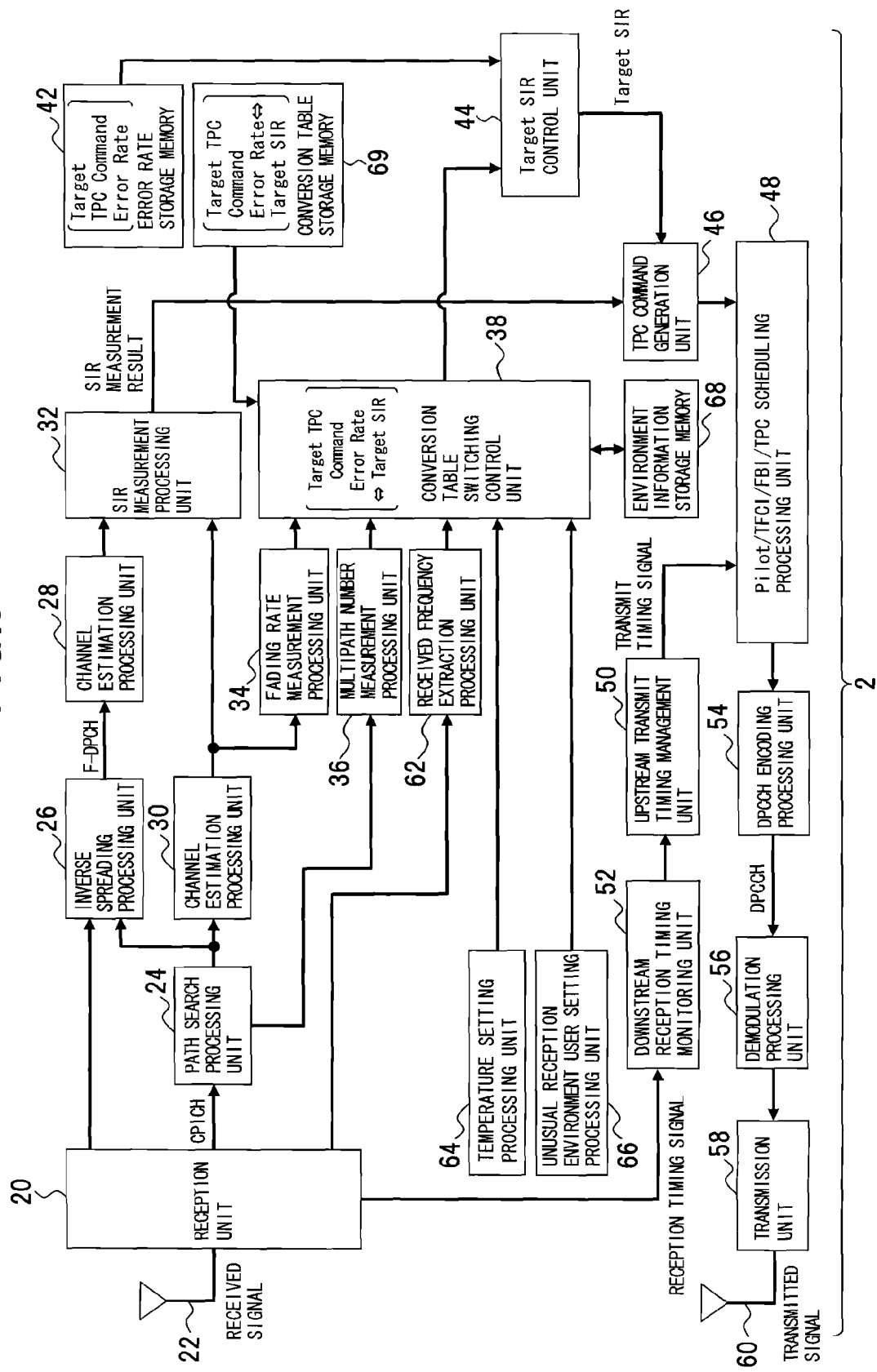
FIG. 6 depicts an example of structure of a mobile terminal device according to a second embodiment.

A second embodiment will be described with reference to FIG. 6. FIG. 6 depicts a mobile terminal device according to the second embodiment. The structure depicted in FIG. 6 is an example, and the present invention is not limited to such structure. In FIG. 6, the same components as described in FIG. 1 are denoted by the same reference numerals.

In the first embodiment, a plurality of conversion tables are set for every reception environment that convert Target TPC Command Error Rate adapting to, for example, a fading rate and/or the number of multipaths as a reception environment and the change thereof to Target SIR, and the fading rate and/or the number of multipaths are measured. In the second embodiment, by switching a conversion table to that adapting to a reception environment and the change thereof using received frequency, temperature or user setting information as the reception environment and the change thereof in addition to the fading rate and/or the number of multipaths, Target SIR is obtained from the switched conversion table. This obtained Target SIR is compared with measured SIR to execute power control using the obtained Target SIR.

This mobile terminal device 2 is configured to provide a received frequency extraction processing unit 62, a temperature setting processing unit 64 and an unusual reception environment user setting processing unit 66 for the mobile terminal device 2 of the first embodiment (FIG. 1), and further, an environment information storage memory 68 is added thereto.

The received frequency extraction processing unit 62 is frequency extracting means that extracts frequency from a received signal as a reception environment and the change thereof. In response to receiving a received signal from the reception unit 20, the received frequency extraction processing unit 62 analyses and extracts the received signal as received frequency, and provides the received frequency or information representing the received frequency to the conversion table switching control unit 38.

The temperature setting processing unit 64 is setting means of temperature as a reception environment and the change thereof, detects environmental temperature, and provides the detected temperature or temperature information set by a user, or information representing the detected temperature or the temperature information to the conversion table switching control unit 38.

The unusual reception environment user setting processing unit 66 is means setting information representing an unusual reception environment which a user recognizes, and provides information for a user specifying the room in a building or a moving vehicle, for example, the inside of an express bus and a railway vehicle such as the inside of a bullet train as an unusual reception environment to the conversion table switching control unit 38.

The environment information storage memory 68 is a storage unit storing environment information, and stores a fading rate FV, the number of multipaths MP, frequency F, temperature T and unusual reception environment setting information XD which are parameters.

In a conversion table storage memory 69, a conversion table of Target SIR corresponding to Target TPC Command Error Rate is stored that uses the fading rate FV, the number of multipaths MP, the frequency F, the temperature T or the unusual reception environment setting information XD as a parameter.

Since other structure is the same as the first embodiment (FIG. 1), the same reference numerals are denoted, and description thereof is omitted.

Figure 7:
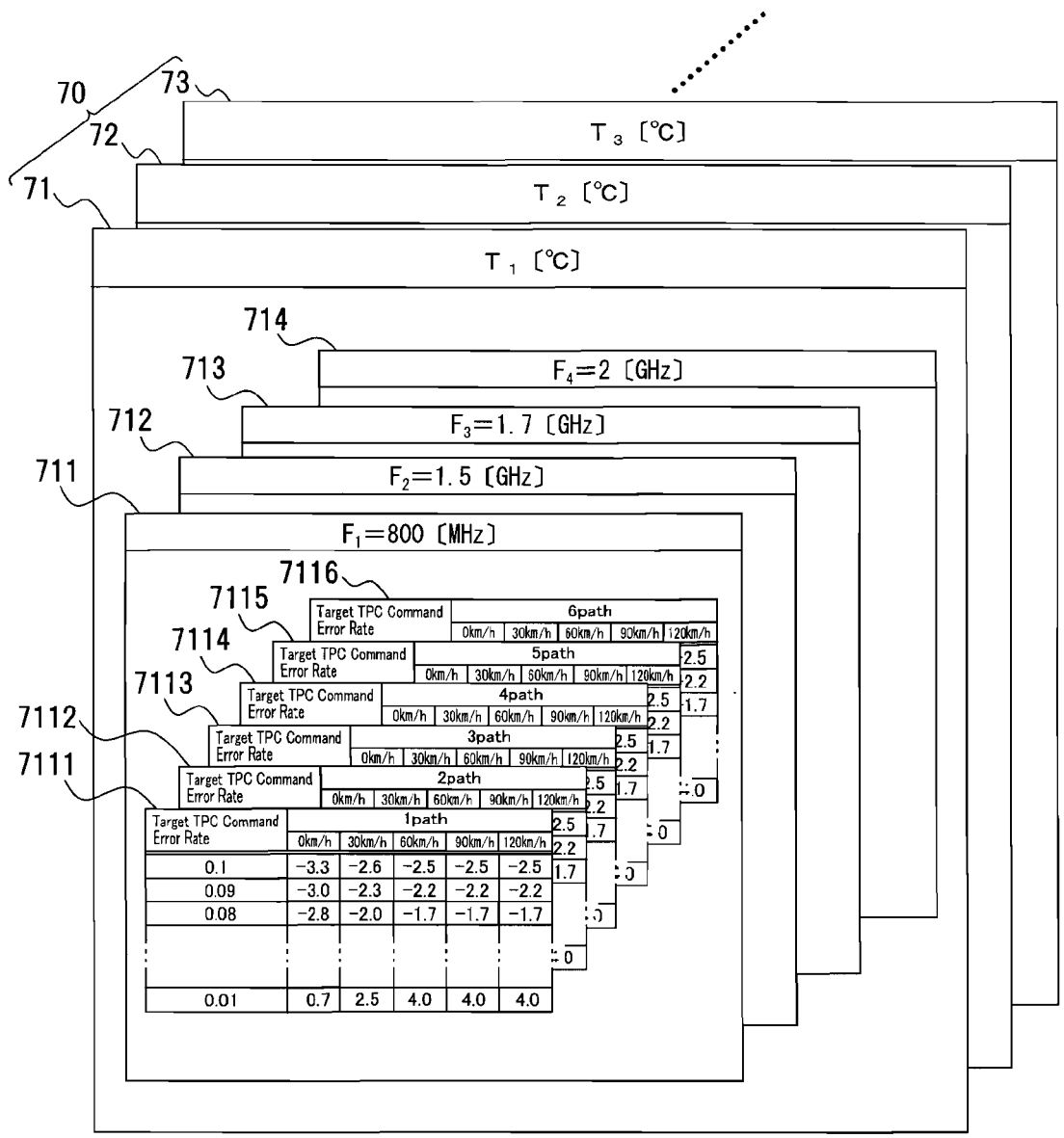
FIG. 7 depicts an example of groups of conversion tables stored in a conversion table storage memory.

The conversion table storage memory 69 will be described with reference to FIGS. 7 and 8. FIG. 7 depicts groups of conversion tables of Target SIR corresponding to Target TPC Command Error Rate that uses the fading rate FV, the number of multipaths MP, the frequency F and the temperature T as parameters, and FIG. 8 depicts a conversion table of Target SIR corresponding to Target TPC Command Error Rate that uses the unusual reception environment setting information XD as a parameter.

In the conversion table storage memory 69, as depicted in FIG. 7, groups of conversion tables 71, 72 and 73 corresponding to a plurality of temperatures $T_1, T_2, T_3 \ldots (T_1<T_2<T_3)$ respectively are set as groups of a plurality of conversion tables 70. In the group of conversion tables 71, groups of conversion tables 711, 712, 713 and 714 are set for every plurality of frequencies $F_1, F_2, F_3$ and $F_4$ ($F_1<F_2<F_3<F_4$). In each of other groups of conversion tables 72 and 73, groups of conversion tables 721 . . . and 731 . . . are set for every plurality of frequencies $F_1, F_2, F_3$ and $F_4$ ($F_1<F_2<F_3<F_4$).

In the group of conversion tables 711, conversion tables 7111, 7112, 7113, 7114 . . . 7116 are set for every number of multipaths $MP_1, MP_2, MP_3, MP_4, MP_5$ and $MP_6$. In other groups of conversion tables 712, 713 and 714, conversion tables 7121 . . . , 7131 . . . , 7141 . . . are set respectively for every number of multipaths $MP_1, MP_2, MP_3, MP_4, MP_5$ and $MP_6$. The structure of the conversion table 7111 is the same as the conversion table 401 in FIG. 3, and the other conversion tables 7112, 7113, 7114 . . . are also the same arrangements.

In the conversion table storage memory 69, as depicted n FIG. 8, a conversion table 80 using the unusual reception environment setting information XD as a parameter is stored. In this conversion table 80, Target SIR corresponding to Target TPC Command Error Rate is stored that uses as a parameter information representing a room mode corresponding to the inside of a building, an express bus mode corresponding to the inside of an express bus and a bullet train mode corresponding to the inside of a bullet train, each of which is one of the unusual reception environment, as user setting modes.

Figure 9:
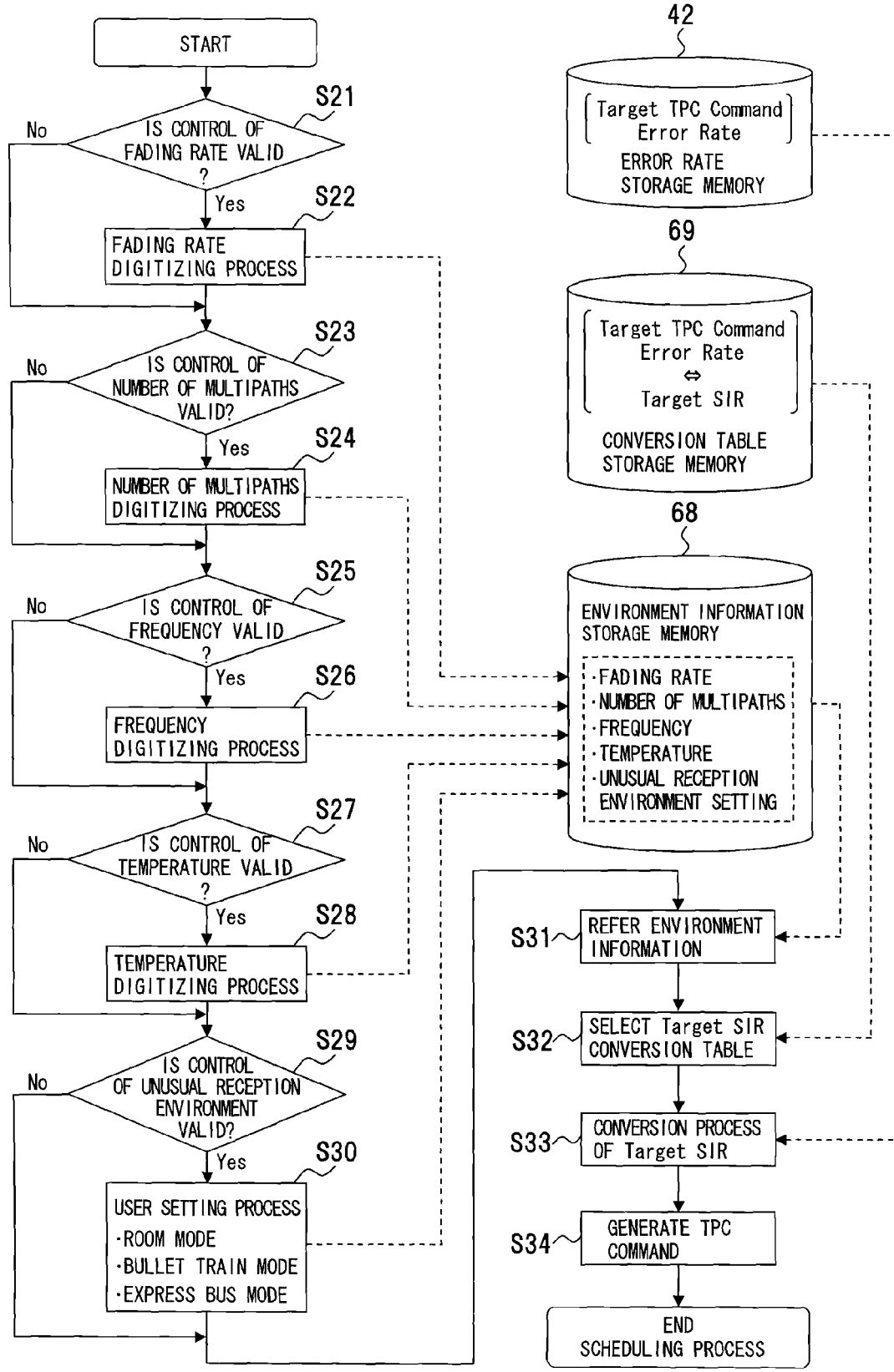
FIG. 9 depicts an example of processing procedure of a generation process of a TPC command.

Processing procedure for power control will be described with reference to FIG. 9. FIG. 9 is a flowchart depicting processing procedure of a generation process of a TPC command. This processing procedure is one example, and the present invention is not limited to this processing procedure.

By start of power control, it is determined whether control of a fading rate is valid or not as a reception environment (step S21). If the control of a fading rate is valid (YES of step S21), a digitizing process of a fading rate is executed (step S22), and the fading rate is used for a selection process of fading rate information in the environment information storage memory 68.

If the control of a fading rate is not valid (NO of step S21), it is determined whether control of the number of multipaths is valid or not as a reception environment without executing the digitizing process of a fading rate (step S23). If the control of the number of multipaths is valid (YES of step S23), a digitizing process of the number of multipaths is executed (step S24), and the number of multipaths is used for the selection process of the number of multipaths in the environment information storage memory 68.

If the control of the number of multipaths is not valid (NO of step S23), it is determined whether control of frequency is valid as a reception environment without executing the digitizing process of the number of multipaths (step S25). If the control of frequency is valid (YES of step S25), a digitizing process of frequency is executed (step S26), and the frequency is used for the selection process of frequency information in the environment information storage memory 68.

If the control of frequency is not valid (NO of step S25), it is determined whether control of temperature is valid as a reception environment without executing the digitizing process of frequency (step S27). If the control of temperature is valid (YES of step S27), a digitizing process of temperature is executed (step S28), and the temperature is used for the selection process of temperature information in the environment information storage memory 68.

If the temperature control is not valid (NO of step S27), it is determined whether control of unusual reception environment is valid as a reception environment without executing the digitizing process of the temperature (step S29). If the control of unusual reception environment is valid (YES of step S29), a user setting process is executed that is the room mode, the express bus mode or the bullet train mode to which user setting is executed as an unusual reception environments (step S30), and the selection process of unusual reception environment setting in the environment information storage memory 68 is executed according to the room mode, express bus mode or bullet train mode which are set.

After these processes, environment information such as the fading rate in the environment information storage memory 68 is referred to (step S31). Based on this environment information, selection of the conversion table 7111 (FIG. 7), etc. from the groups of conversion tables 70 of Target SIR in the conversion table storage memory 69, and selection of the conversion table 80 are executed (step S32), a conversion process of Target SIR is executed using the selected conversion table 7111, etc., the conversion table 80 and the error rate storage memory 42 (step S33), and a TPC command is generated from Target SIR that is obtained from this conversion process (step S34). After this generation of a TPC command, the above described scheduling process is executed.

Therefore, in the TPC control of F-DPCH, as a conversion table that converts Target TPC Command Error Rate to Target SIR, Target TPC Command Error Rate adapting to information of a fading rate, the number of multipaths, frequency, temperature or unusual reception environment setting, which are a reception environment and the change thereof, can be converted to Target SIR, TPC control can be executed by obtaining optimum Target SIR corresponding to a reception environment and the change thereof, and power control of F-DPCH can be properly executed.

Third Embodiment

Figure 10:
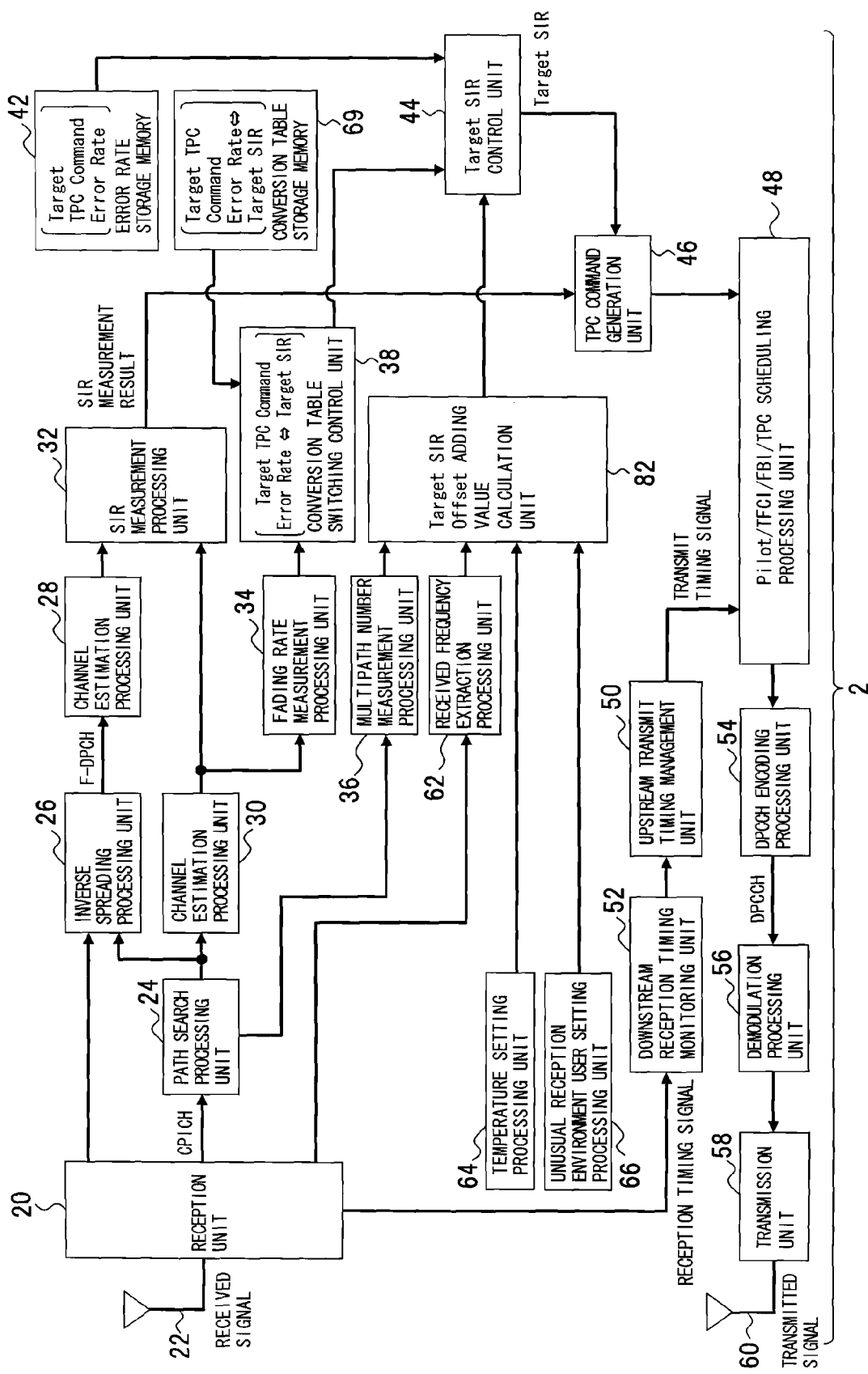
FIG. 10 depicts an example of structure of a mobile terminal device according to a third embodiment.

A third embodiment will be described with reference to FIG. 10. FIG. 10 depicts a mobile terminal device according to the third embodiment. The structure depicted in FIG. 10 is an example, and the present invention is not limited to such structure. In FIG. 10, the same components as described in FIG. 6 are denoted by the same reference numerals.

In the first or second embodiment, a plurality of conversion tables are set for every reception environment that convert Target TPC Command Error Rate adapting to, for example, a fading rate and/or the number of multipaths, frequency, temperature or an unusual reception environment as a reception environment and the change thereof to Target SIR. In the third embodiment, a conversion table corresponding to the fading rate as a specific reception environment is set, and concerning the number of multipaths, received frequency, temperature and an unusual reception environment, Target SIR obtained correspondingly to the fading rate is corrected by a Target SIR offset addition value (plus or minus) as correction data. Thus, power control is executed using Target SIR corresponding to a reception environment and the change thereof.

In this mobile terminal device 2, only the fading rate measurement processing unit 34 is correlated with the conversion table switching control unit 38 in the mobile terminal device 2 (FIG. 6) in the second embodiment, and a Target SIR Offset adding value calculation unit 82 is disposed separately from the conversion table switching control unit 38. For this Target SIR Offset adding value calculation unit 82, an offset adding value is calculated from the output from the multipath number measurement processing unit 36, the received frequency extraction processing unit 62, the temperature setting processing unit 64 and the unusual reception environment user setting processing unit 66. By this offset adding value, Target SIR is corrected.

The Target SIR Offset adding value calculation unit 82 is means calculating an offset adding value of Target SIR. An offset adding value is calculated using digitized information representing the number of multipaths measured in the multipath number measurement processing unit 36, received frequency extracted in the received frequency extraction processing unit 62, temperature set in the temperature setting processing unit 64 or unusual reception environment set in the unusual reception environment user setting processing unit 66 to be provided for the Target SIR control unit 44.

In such structure, Target SIR is calculated in accordance with the fading rate measured in the fading rate measurement processing unit 34. In the Target SIR Offset adding value calculation unit 82, an offset adding value Δ Target SIR is obtained using digitized information representing the number of multipaths measured in the multipath number measurement processing unit 36, received frequency extracted in the received frequency extraction processing unit 62, temperature set in the temperature setting processing unit 64 or unusual reception environment set in the unusual reception environment user setting processing unit 66. Target SIR' that is corrected by the offset adding value Δ Target SIR is:

$$\text{Target SIR'} = \text{Target SIR} \pm \Delta \text{ Target SIR} \square\square\square \qquad (1)$$

Using this Target SIR' can execute TPC control by obtaining optimum Target SIR corresponding to a reception environment and the change thereof, and the power control of F-DPCH can be properly executed.

Since other structure is the same as the second embodiment (FIG. 6), the same reference numerals are denoted and description thereof is omitted.

Other Embodiments

In the third embodiment (FIG. 10), the environment information storage memory 68 (FIG. 6) may be used and fading rate information may be stored in this environment information storage memory 68, thereby, the processing procedure depicted in FIG. 9 is executed.

Figure 11:
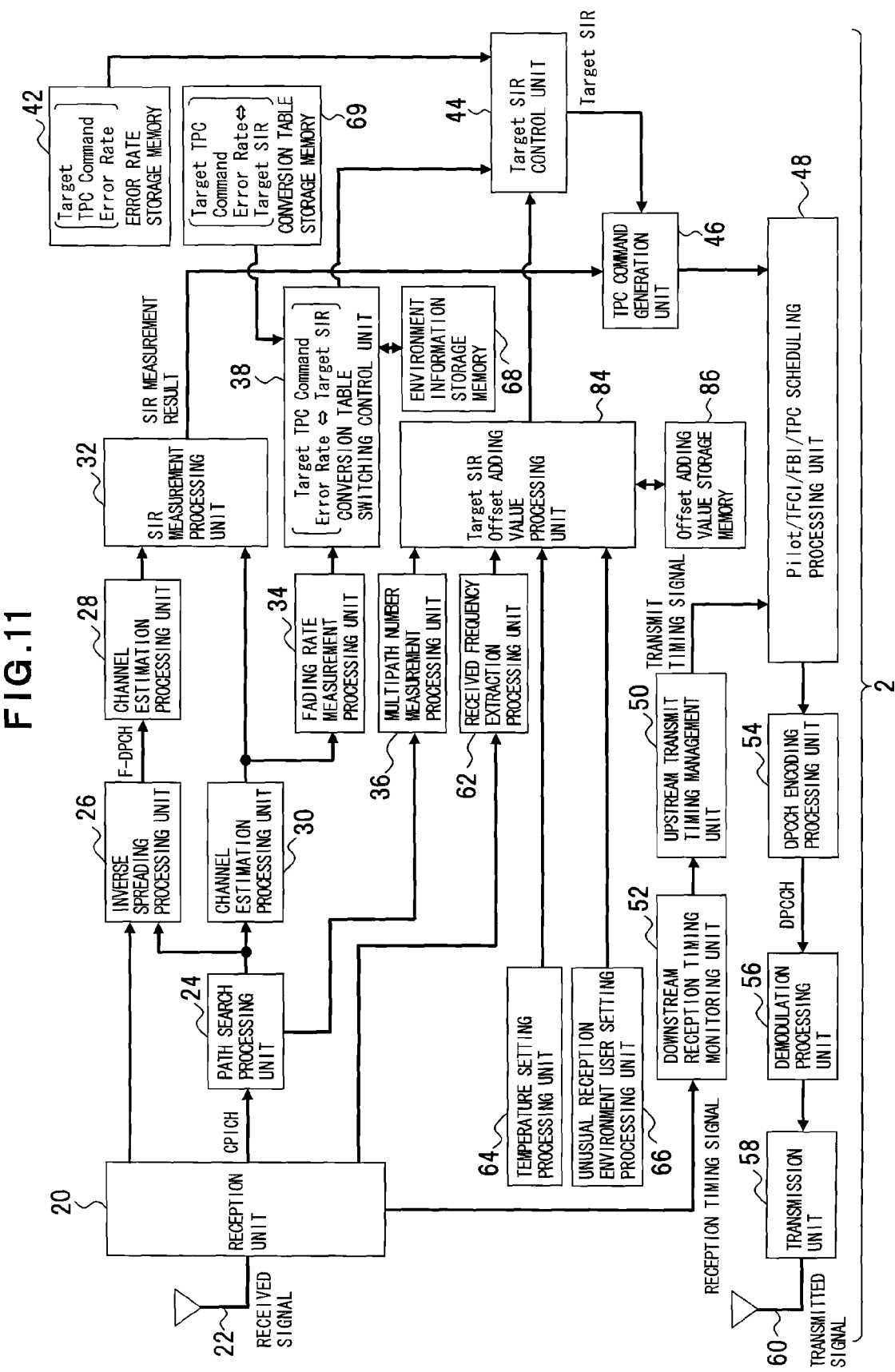
FIG. 11 depicts an example of structure of a mobile terminal device according to another embodiment.

Instead of the Target SIR Offset adding value calculation unit 82 (FIG. 10), as depicted in FIG. 11, a Target SIR Offset adding value processing unit 84 may be disposed and an Offset adding value storage memory 86 may be disposed. The Offset adding value storage memory 86 is a storage unit storing an offset adding value of Target SIR, and stores a Target SIR offset adding value calculated in advance. The Target SIR Offset adding value processing unit 84 selects a Target SIR offset adding value corresponding to a reception environment from the Offset adding value storage memory 86 by the measured number of multipaths, received frequency, temperature or unusual reception environment, and this selected offset adding value may be used.

In the first embodiment (FIG. 1), the environment information storage memory 68 (FIG. 6) may be used, and a conversion table may be switched using data read out from the conversion table storage memory 69.

As an unusual reception environment, a reception environment in a tunnel is assumed. When the mobile terminal device 2 enters in the tunnel, Target SIR may be changed automatically or by user setting to execute power control corresponding to the reception environment in the tunnel.

Technical ideas extracted from the embodiments of the present invention described above will then be listed. The technical ideas of the embodiments of the the present invention may be comprehended at various levels and variations ranging from higher to lower conceptions and the embodiments of the present invention is not limited to the following description.

A method of transmit power control to allow a transmission side to execute transmit power control so that a signal to interference ratio (SIR) measured at a reception side is matched with a target SIR, the method includes digitizing a reception environment at the reception side, and setting the target SIR corresponding to an error rate of reception data for each of the reception environments; and changing the target SIR in accordance with the reception environment measured at the reception side or the reception environment selected at the reception side. According to such structure, power control can be executed with high accuracy in comply with a reception environment since the target SIR set by each reception environment is changed according to the change of the reception environment.

In the above method of transmit power control, preferably, a correction value for the target SIR may be set for each of the reception environments, and the target SIR may be changed using the correction value by increasing or reducing the target SIR according to a change of the reception environment. The reception environment that is digitized may be a fading environment. The reception environment that is digitized may be a multipath environment. The reception environment that is digitized may be received frequency. The reception environment that is digitized may be temperature. A multipath environment, received frequency or temperature may be digitized, a target SIR offset value adapting to the reception environment may be obtained, and the target SIR corresponding to a fading environment may be corrected by the target SIR offset value.

A device of transmit power control to allow a transmission side to execute transmit power control so that an SIR measured at a reception side is matched with a target SIR, the device includes a storage unit to be set for each reception environment at the reception side, and to store the target SIR corresponding to an error rate of reception data; and a control unit to update the SIR to the target SIR in accordance with the reception environment measured at the reception side or the reception environment selected at the reception side.

In the above device of transmit power control, preferably, the control unit may set a correction value for the target SIR for each of the reception environments, and change the target SIR using the correction value by increasing or reducing the target SIR according to a change of the reception environment. The reception environment that is digitized may be a multipath environment. The reception environment that is digitized may be a fading environment. The reception environment that is digitized may be received frequency. The reception environment that is digitized may be temperature. The above device of transmit power control may further include a calculation unit to digitize multipath environment, received frequency or temperature, and calculate a target SIR offset value adapting to the reception environment; and an adding unit to add the target SIR offset value corresponding to a fading environment to the target SIR.

According to the embodiments of the present invention, the following effects can be obtained.

(1) Since the target SIR adapting to the reception environment at a reception side and the change thereof is obtained, and transmit power at a base station side is controlled, the transmit power can be controlled so as to adapt to the reception environment.

(2) The error rate of reception data can be measured with high accuracy adaptingly to a reception environment such as a fading environment, a multipath environment, temperature and a reception frequency, and the change thereof, and the measured error rate is used. Thereby, power control at a base station side can be improved.

(3) Since transmit power at a transmission side can be suppressed, bearing on wireless resources and lowering throughput of a system can be prevented. Since transmitting with transmit power below the reception capability at a reception side can be prevented, transmit power control at the reception side is not spoiled, and transmit and receive throughput at the reception side and system throughput can be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

While the most preferred embodiments of the present invention have been described hereinabove, the present invention is not limited to the above embodiments, and it is a matter of course that various variations and modifications can be made by those skilled in the art based on the spirit of the invention described in claims or disclosed in the description, and needless to say, such variations and modifications are also encompassed in the scope of the present invention.

The embodiments of the present invention relates to a method of transmit power control used for a wireless communication system of a W-CDMA system, etc. and an apparatus thereof, and controls transmit power at a base station side by obtaining a target SIR adapting to the reception environment at a reception side and the change thereof. The present invention can control transmit power adapting to the reception environment, thus is useful.

What is claimed is:

1. A method of transmit power control to allow a transmission side to execute transmit power control so that a signal to interference ratio (SIR) measured at a reception side is matched with a target SIR, the method comprising:
   selecting a conversion rule corresponding to a reception environment measured or selected at a reception side, among conversion rules each of which is associated with a digitized reception environment, wherein the conversion rule indicates a relationship between a conversion source and a target SIR;
   obtaining a target SIR from a conversion source according to the conversion rule selected based on the reception environment measured or selected at the reception side; and
   performing the transmit power control by using the target SIR obtained from the conversion source.

2. The method of transmit power control of claim 1, wherein
   a correction value for the target SIR is set for each of the reception environments,
the target SIR obtained from the conversion source is changed using the correction value by increasing or reducing the target SIR according to a change of the reception environment, and
   the transmit power control is performed using the target SIR changed by the correction value.

3. The method of transmit power control of claim 1, wherein
   the reception environment that is digitized is a fading environment.

4. The method of transmit power control of claim 1, wherein
   the reception environment that is digitized is a multipath environment.

5. The method of transmit power control of claim 1, wherein
   the reception environment that is digitized is received frequency.

6. The method of transmit power control of claim 1, wherein
   the reception environment that is digitized is temperature.

7. The method of transmit power control of claim 1, wherein
   a multipath environment, received frequency or temperature is digitized, a target SIR offset value adapting to the reception environment is obtained, and the target SIR corresponding to a fading environment is corrected by the target SIR offset value.

8. A device of transmit power control to allow a transmission side to execute transmit power control so that an SIR measured at a reception side is matched with a target SIR, the device comprising:
   a control unit to change a conversion rule for obtaining a target SIR from a conversion source, according to a reception environment measured or selected at a reception side.

9. The device of transmit power control of claim 8, wherein
   the control unit sets a correction value for the target SIR for each of the reception environments, and changes the target SIR using the correction value by increasing or reducing the target SIR according to a change of the reception environment.

10. The device of transmit power control of claim 8, wherein
    the reception environment that is digitized is a multipath environment.

11. The device of transmit power control of claim 8, wherein
    the reception environment that is digitized is a fading environment.

12. The device of transmit power control of claim 9, wherein
    the reception environment that is digitized is a fading environment.

13. The device of transmit power control of claim 8, wherein
    the reception environment that is digitized is received frequency.

14. The device of transmit power control of claim 8, wherein
    the reception environment that is digitized is temperature.

15. The device of transmit power control of claim 8, further comprising:
    a calculation unit to digitize multipath environment, received frequency or temperature, and calculate a target SIR offset value adapting to the reception environment; and
    an adding unit to add the target SIR offset value corresponding to a fading environment to the target SIR.

* * * * *